(12) United States Patent
Stuckl et al.

(10) Patent No.: US 9,884,682 B2
(45) Date of Patent: Feb. 6, 2018

(54) AIRCRAFT CONFIGURATION

(71) Applicant: Airbus Defence and Space GmbH, Ottobrunn (DE)

(72) Inventors: Stefan Stuckl, Munich (DE); Jan van Toor, Munich (DE)

(73) Assignee: Airbus Defence and Space GMBH (DE)

( * ) Notice: Subject to any disclaimer, the term of this patent is extended or adjusted under 35 U.S.C. 154(b) by 429 days.

(21) Appl. No.: 14/565,775

(22) Filed: Dec. 10, 2014

(65) Prior Publication Data

US 2015/0183518 A1 Jul. 2, 2015

(30) Foreign Application Priority Data

Dec. 11, 2013 (DE) .................. 10 2013 020 601

(51) Int. Cl.
  *B64C 39/08* (2006.01)
  *B64C 3/10* (2006.01)
  *B64C 3/32* (2006.01)
  *B64D 27/24* (2006.01)
  *B64D 27/02* (2006.01)

(52) U.S. Cl.
  CPC ............... *B64C 39/08* (2013.01); *B64C 3/10* (2013.01); *B64C 3/32* (2013.01); *B64D 27/24* (2013.01); *B64D 2027/026* (2013.01); *Y10S 903/902* (2013.01)

(58) Field of Classification Search
  CPC .................................... B64C 39/024
  USPC .......................................... 244/13
  See application file for complete search history.

(56) References Cited

U.S. PATENT DOCUMENTS

| 2,402,311 | A | * | 6/1946 | Bissett | .................. B64C 39/00 244/13 |
| 3,954,231 | A | * | 5/1976 | Fraser | ...................... B64C 3/16 244/225 |
| 4,146,199 | A | | 3/1979 | Wenzel | |
| 4,165,058 | A | | 8/1979 | Whitener | |
| 4,598,888 | A | * | 7/1986 | Beteille | .................. B64C 39/12 244/178 |

(Continued)

FOREIGN PATENT DOCUMENTS

| EP | 0716978 A1 | 6/1996 |
| FR | 510306 A | 12/1920 |
| FR | 682950 A | 6/1930 |

OTHER PUBLICATIONS

English Translation of FR510306A.
English Translation of FR682950A.

*Primary Examiner* — Brian M O'Hara
*Assistant Examiner* — Keith L Dixon
(74) *Attorney, Agent, or Firm* — Ziolkowski Patent Solutions Group, SC

(57) ABSTRACT

An aircraft (1), in particular a passenger or cargo aircraft, with a fuselage (2), has a tandem wing arrangement and has at least two aero engines (5, 6) disposed on the upper surface of the rear wing (4). In this way the disadvantages of the known solutions of the prior art are avoided and an improved aircraft configuration with improved aerodynamics, namely clearly reduced induced drag, is provided. Moreover, the invention creates an environmentally friendly aircraft design which conserves resources, increasing the acceptance of such aircraft among the population.

12 Claims, 3 Drawing Sheets

(56) References Cited

U.S. PATENT DOCUMENTS

| | | | | |
|---|---|---|---|---|
| 5,320,306 | A * | 6/1994 | Gennaro | B64C 39/08 244/45 R |
| 6,575,406 | B2 * | 6/2003 | Nelson | B64C 1/0009 244/119 |
| 6,651,928 | B1 * | 11/2003 | Stuhr | B64C 3/32 244/102 R |
| 6,705,567 | B2 * | 3/2004 | Dong | B64C 30/00 244/117 R |
| 6,969,026 | B2 * | 11/2005 | Kayama | B64C 27/24 244/117 R |
| 7,874,514 | B2 * | 1/2011 | Said | B64C 3/385 114/273 |
| 8,262,017 | B2 * | 9/2012 | Fraser | B64C 39/08 244/35 R |
| 2006/0151666 | A1 | 7/2006 | VanderMey et al. | |
| 2008/0001025 | A1 | 1/2008 | Said | |
| 2010/0044521 | A1 | 2/2010 | Wilby | |
| 2010/0200703 | A1 | 8/2010 | Cazals et al. | |
| 2011/0168835 | A1 | 7/2011 | Oliver | |
| 2011/0180660 | A1 | 7/2011 | Llamas | |
| 2013/0264428 | A1 | 10/2013 | Rouyre | |

* cited by examiner

AIRCRAFT CONFIGURATION

CROSS-REFERENCE TO RELATED APPLICATION

The present application claims priority to German Application No. 10 2013 020 601.4, filed Dec. 11, 2013, the disclosure of which is incorporated by reference herein in its entirety.

The invention relates to an aircraft, in particular a passenger or cargo aircraft, comprising an single fuselage with passenger and/or cargo cabin.

The most varied aircraft configurations are known for such aircraft from the prior art. In this case for current passenger aircraft the most widespread variant is the kite configuration, i.e. a fuselage with a main wing and a small elevator at the rear. Here the lift for the entire aircraft is generated by the surface of the main wing or the aerofoil, the elevator serves merely for stabilization, i.e. as a rule it generates a downthrust. In this case the neutral point of the aircraft is located behind the center of gravity of the aircraft, so that a flight attitude which is stable in terms of flight mechanics is ensured.

It is also known that the aerodynamic quality of an aircraft has a substantial effect on the fuel consumption and the range thereof. In this case the induced drag plays an important role for the aerodynamics. The most important influential factors on the induced drag ($C_{d,i}$) of an aircraft are essentially the lift distribution on the wing (e) and the aspect ratio thereof (AR), as can be seen from the generally known quadratic approximation (eq. 1):

$$C_{d,i} = \frac{1}{\pi A Re} C_l^2$$

An elliptical lift distribution represents the theoretical optimum which is also achieved approximately with certain limitations in current aircraft (e~0.8). However, there are natural limits to the aspect ratio of the wing due to structural aspects, in particular the bending moment occurring on the wing root, and limitations of the span, in particular due to the requirements of the airport operator. Therefore the dimensionless wing aspect ratio (AR) is typically approximately 8-12.

Therefore the object of the invention is to avoid the disadvantages of the known solutions of the prior art and to provide an improved aircraft configuration with improved aerodynamics, namely clearly reduced induced drags. Moreover an environmentally friendly aircraft design which conserves resources should be created by the invention, increasing the acceptance of such aircraft among the population.

This object is achieved according to the invention by an aircraft with the features of claim 1. Advantageous embodiments and modifications of the invention are set out in the dependent claims.

In the aircraft according to the invention a tandem wing configuration is provided, in which the required wing surface area is distributed over two separate wings. If structural features do not constitute a limitation, with the same span the aspect ratio of the individual wings can be doubled thereby by comparison with a conventional kite configuration, which according to equation 1 entails a halving of the induced drag. Moreover the power unit integration takes place on the rear wing, which provides further advantages.

Tandem wing designs are indeed also known from the prior art, and in the field of commercial aviation are accompanied by double fuselage configurations, as can be seen for example from U.S. Pat. No. 4,165,058 or from US 2010/0044521 A1. However, these differ in many respects from the present invention.

In U.S. Pat. No. 4,165,058 two rectangular wings are disposed one behind the other in such a way that the front wing is fastened on the underside of the fuselage, rather in the manner of a low-wing aircraft, and the rear wing is fastened on the rudders disposed on the top of the fuselage, rather in the manner of a high-wing aircraft. The span of the two rectangular wings are the same size. In this case the aero engines are located behind the front wing, either on the side of the fuselage tube facing the respective other fuselage or at the rear in the rear tail unit or below the lower aerofoil.

In US 2010/0044521 A1 two independent fuselage tubes are connected by means of swept-forward tandem wings. In this case the front wing mounted on the underside of the fuselage has a greater span than the rear wing mounted on the top of the fuselage. The propulsion should be provided by aero engines mounted on the rear wing between the two fuselages.

However in these double fuselage configurations the difficulty of operation in flight and on the ground is disadvantageous. Thus the pilots only have a restricted view and can only maneuver the aircraft with difficulty even on the airfield. Moreover present-day airport terminals are not suitable for the loading and unloading of double-fuselage aircraft.

An aircraft according to the invention, in particular a passenger or cargo aircraft, with a fuselage, has a tandem wing arrangement and at least two aero engines disposed on the upper surface of the rear wing. Due to this configuration a halving of the induced drag and a reduction in the bending moment on the wing root can take place, so that the structural limitation of the wing aspect ratio is counteracted. A further positive effect of the configuration according to the invention is that both wings take on the function of an elevator. As a result it is possible to save on the drag and the weighting of the elevator and the downthrust usually generated there can be avoided. On the wings the laminar incident flow is not disrupted by propellers or an engine jet, so that a laminar flow with low frictional drag can be implemented by corresponding airfoils or other technical means.

An advantageous modification of the invention provides that the two wings of the tandem wing arrangement are vertically spaced apart in the vertical or yaw axes direction. As a result the incident flow onto the rear wing in the flight direction is improved.

A further advantageous modification of the invention provides that the front wing is fastened to the top of the fuselage, whereas the rear wing is fastened to the underside of the fuselage. As a result the rear wing experiences an optimal incident flow, since the outflowing air from the front wing flows off in a slightly downward direction from the rear edge of the wing.

A further advantageous modification of the invention provides that both wings have an aspect ratio (AR) in the range of $12 \leq AR \leq 25$, in particular $16 \leq AR \leq 24$. Although technically even greater aspect ratios can be achieved, the span is limited by the 25 requirements of the airport operator. Also a significant reduction in the takeoff weight can facilitate a higher wing aspect ratio with the same span, since in this case the required lift surface area and thus the wing depth is smaller.

Moreover a further advantageous modification of the invention provides that both wings are constructed as multiple trapezoidal wings. In this case the wing can advantageously be constructed as a straight wing without a V shape or a bend.

An advantageous modification of the invention provides that the rear wing has a greater span than the front wing. In this way the aero engines can be more easily integrated on the rear wing.

An advantageous modification of the invention provides that the lift distribution between the lift of the front wing and the lift of the rear wing is approximately 45:55, preferably 50:50.

An advantageous modification of the invention provides that the at least two aero engines are disposed on pylons on the upper surface of the wing which is to the rear in the flight direction. In this case conventional combustion engines with fuel and propeller system or hybrid drives with additional electric drive unit, generator and battery or a purely electric drive can be provided as drive units. Such a drive arrangement on the upper surface of the wing reduce the noise emission downwards, which significantly increases the environmental compatibility of the aircraft configuration according to the invention. In cross-section the pylons have the shape of a symmetrical flow profile and thereby form additional stabilization surfaces.

A further advantageous modification of the invention provides that a further aero engine is provided at the rear of the aircraft fuselage. A further propeller system can optionally be installed on the rear fuselage in order also to achieve the effect of boundary layer acceleration by acceleration of the fuselage boundary layer. In this case because of its limited space requirement an electric drive can advantageously be used which can be easily integrated into the rear cone of the fuselage contour.

Moreover an advantageous modification of the invention provides that a propeller drive is provided as an aero engine which may for example have a thrust propeller. The propellers can advantageously be mounted as thrust propellers, i.e. so-called pusher propellers, at the end of the drive train. As a result the possibility exists of increasing the drive efficiency by boundary layer acceleration on the wings.

Another advantageous modification of the invention provides that housing tubes are provided which extend between the two wings. Both wings or aerofoils can be connected to two substantially cylindrical housing tubes which are parallel to the fuselage and to the longitudinal axis of the aircraft and in which conventional hybrid-electric or fully-electric drive units are located. In this way the bending moment on the wing root is reduced, so that the wing supporting structure can be of lighter construction. Thereby the housing tubes can be connected to the lower surface of the front wing and via the pylon to the rear wing. The housing tubes can be advantageously configured so that because of their good accessibility on the ground for example batteries can be quickly and easily removed and replaced from below by a lifting mechanism. In this case the housing tubes can also be formed in such a way that cylindrical tubular battery or accumulator elements are secured on a support structure, for example a support profile, which extends between the front wing and the rear wing. Thus the housing tube can be formed from a plurality of such accumulator elements which are lined up one behind the other on the support profile. Furthermore the arrangement of the fuel or the batteries outside the fuselage with the passenger cabin offers additional safety for the passengers in the event of a fire or an emergency landing.

A further advantageous modification of the invention provides that the aircraft is designed to be unstable in terms of flight mechanics. This is achieved by a mathematically unstable neutral point position in order to avoid a disruptive downthrust element such as the elevator in conventional aircraft and to achieve an approximately uniform distribution of surface area and lift between the two wings. In this case an automatic flight controller, for example in the form of control software for controlling corresponding actuators, is provided in order to provide the aircraft with artificial stability. In this case the actuators serve for actuation of control surfaces such as flaps and rudders. Such aircraft controls for configurations which are unstable in terms of flight mechanics are already known from military aviation. Finally, the aircraft can be provided as manned passenger or cargo aircraft.

Further measures which improve the invention are explained in greater detail below together with the description of a preferred embodiment of the invention with reference to the drawings. In the drawings.

Figure 1:
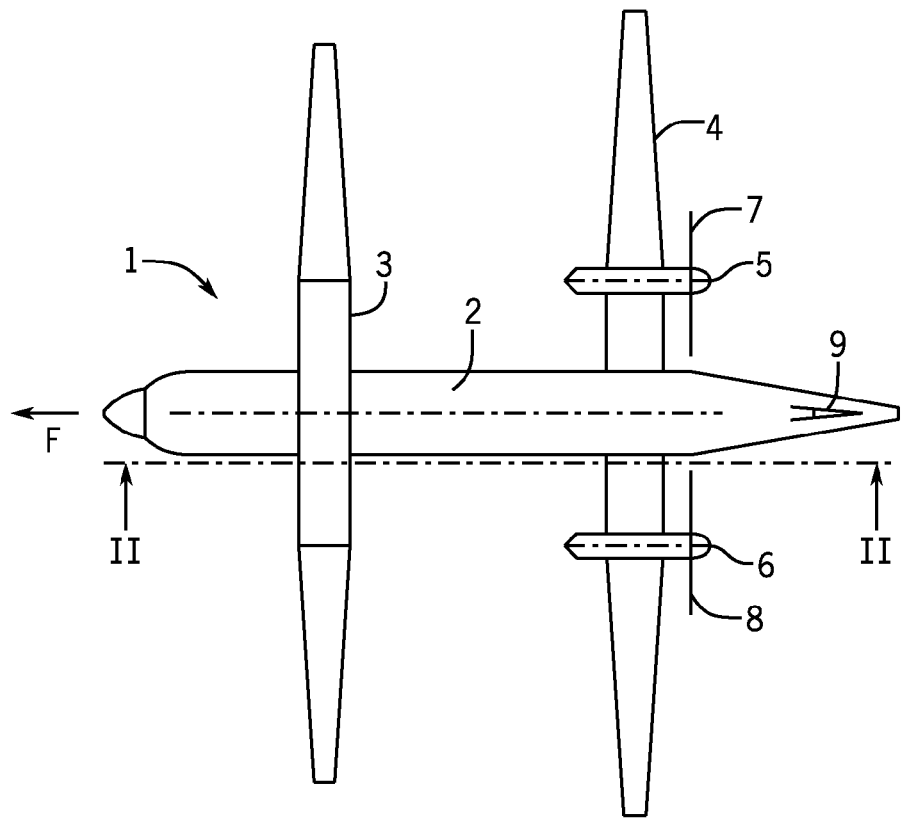
FIG. 1 shows a schematic plan view of a first embodiment according to the invention of an aircraft configuration.

In the drawings the same or equivalent components are provided with the same reference signs. Unless otherwise stated, directional details relate to the axes of the aircraft, namely the longitudinal axis L, transverse axis Q and vertical axis H.

Figure 2:
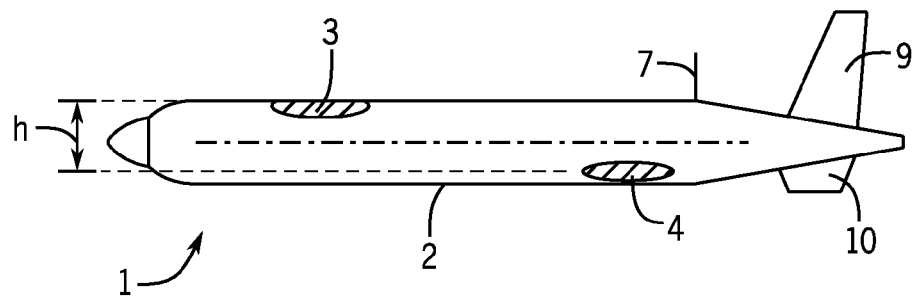
FIG. 2 shows a sectional view along the section line II-II in FIG. 1.

FIGS. 1 and 2 show a first embodiment according to the invention of a configuration of an aircraft 1 with a longitudinal tubular fuselage 2, with a front wing 3 and a rear wing 4. Furthermore on the rear wing 4 two aero engines 5, 6 are mounted respectively on the left and the right of the fuselage 2. The aero engines are provided with thrust propellers 7, 8. Furthermore a rear tail unit 9 and a fin 10 are disposed at the rear of the aircraft 1.

In this case the front wing 3 has a smaller span than the rear wing 4. In the present embodiment the aspect ratio of the front wing 3 amounts to 16, whereas the aspect ratio of the rear wing amounts to 18. The lift ratio of the front wing to the rear wing 4 amounts to approximately 45:55. Due to the substantial aspect ratio the wing depth by comparison with conventional passenger aircraft is small. The wing structure can be of more lightweight design.

Furthermore an unswept multiple trapezoidal wing can be used, as shown by way of example in the attached drawings. In this case each individual wing 3, 4 can have control elements, such as elevators, ailerons and landing flaps (not shown). The wings themselves can be produced from fibre-reinforced plastic, in particular carbon fibre. Due to the use of such materials laminar profiles can be used.

In the present embodiment the front wing 3 and the rear wing 4 in the direction of travel F are spaced apart vertically, i.e. in the vertical axial direction. In this case the front wing 3 is disposed on the upper part of the fuselage 2, more or less in the form of a high-wing aircraft. The rear wing 4 is disposed in the form of a low-wing aircraft on the lower part of the fuselage 2. The ratio of the vertical spacing h of the wings to the spacing of the wings 3, 4 in the longitudinal axial direction may be a ratio of approximately 1:5.

In the present first embodiment the aero engines 5, 6 may be constructed as conventional kerosene-fuelled turboprop engines. However, fuel cell drives, hybrid drives and purely electric drives can also be used. Since the speed range for this aircraft configuration is <Mach 0.6, the specific thrust can be kept in a low range, as is usual in turboprop engines. Furthermore, due to the small wing depth and the selected speed range a airfoil can be used around which a laminar flow circulates.

Since in the aircraft configuration according to the invention the neutral point is located before the center of gravity, the aircraft is unstable. In order to keep the aircraft in a stable flight attitude an electronic flight control is provided.

Figure 3:
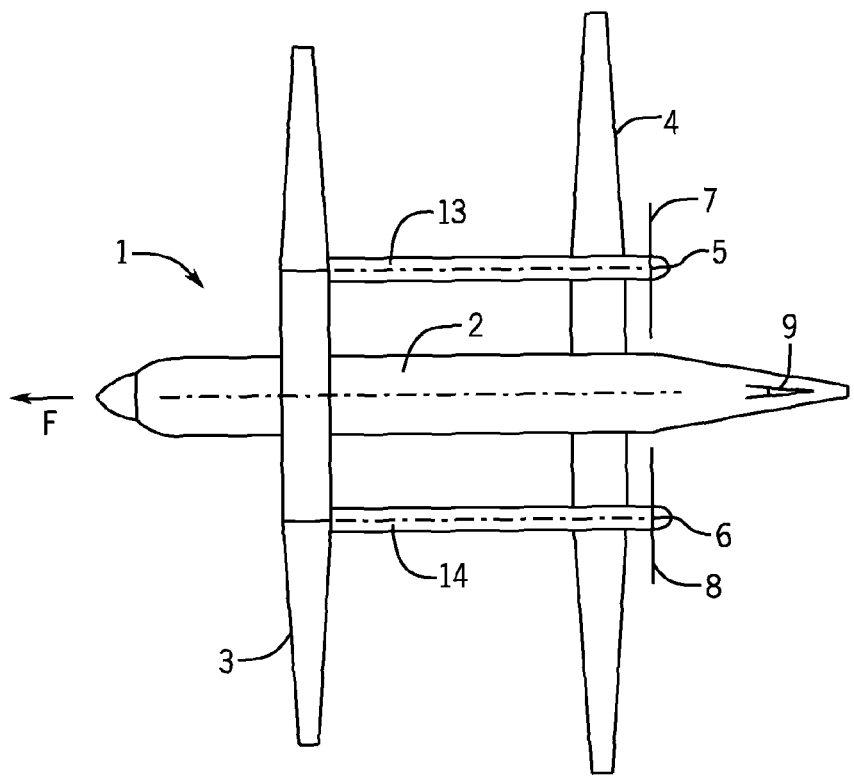
FIG. 3 shows a schematic plan view of a second embodiment according to the invention of an aircraft configuration.
Figure 4:
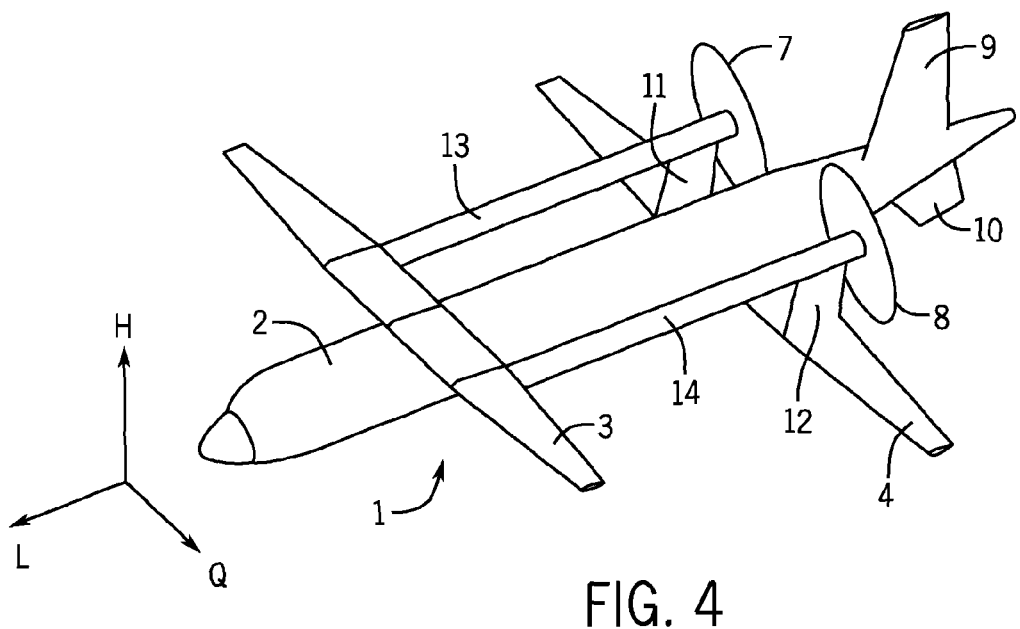
FIG. 4 shows an isometric view of the aircraft of FIG. 3.

A second advantageous embodiment is shown in FIGS. 3 and 4. The second embodiment differs from the first embodiment only in that here substantially cylindrical housings 13, 14 are disposed on the left and right of the aircraft fuselage, and two electric aero engines 5, 6 are used. Moreover, reference is made to the statements relating to the first embodiment. As can be seen in particular from FIG. 4, the housings 13, 14 extend between the front wing 3 and the rear wing 4. In this case the housings 13, 14 on the front wings 3 are fastened to the underside thereof. On the rear wing 4 the housing 13, 14 transitions into the casing of the aero engine 5, 6 and, like this latter, is connected the rear wing 4 by means of pylons 11, 12 on the upper face of the rear wing 4. However, the housing can also be disposed below, above or laterally with respect to the casing of the aero engine 5, 6.

In this case the housings 13, 14 have a sufficient strength and rigidity in order to avoid vibrations and fluttering. On the other hand, accumulators accommodated in the housing 13, 14 can be simply removed from the housing and returned again on the ground by means of battery cases which are accessible and replaceable from below.

Figure 5:
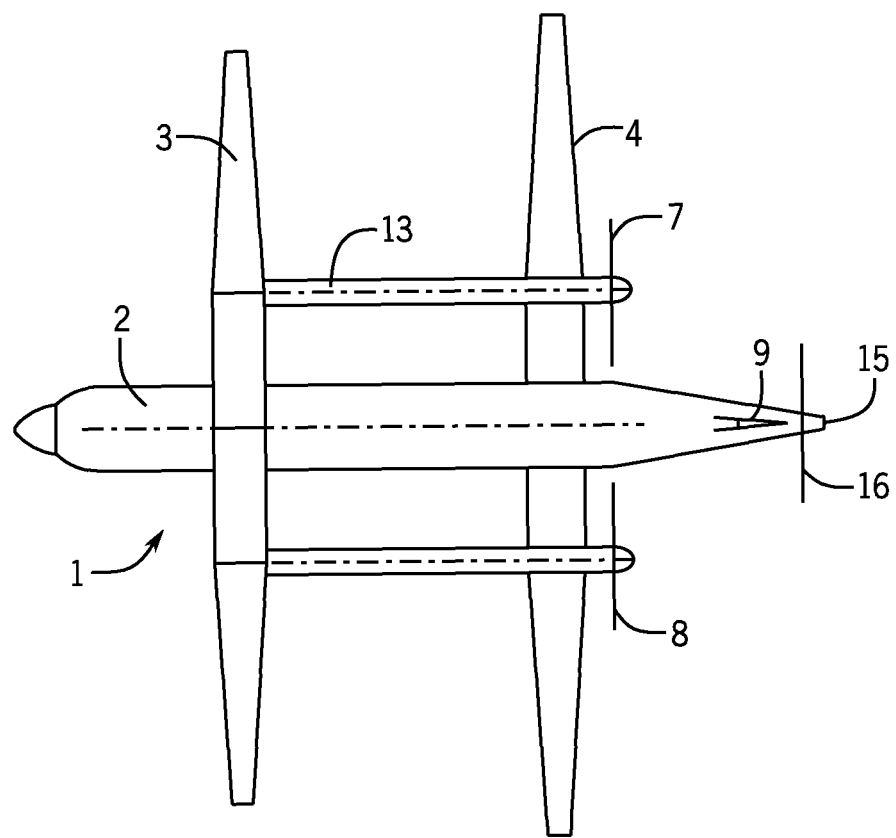
FIG. 5 shows a plan view of a third embodiment according to the invention of an aircraft configuration.

Finally FIG. 5 shows a third advantageous embodiment which differs from the second embodiment described above in such a way that a third aero engine 15 with a propeller 16 is disposed at the rear of the fuselage 2. In this case the drive is disposed in such a way that the propeller shaft exits on the rear cone. Due to the incident flow onto the aero engine 15 which is likewise equipped with a thrust propeller 16 and disposed centrally in the rear fuselage, a boundary layer acceleration can be achieved in the rear region of the fuselage 2. This additionally contributes to the improvement of the aerodynamic characteristics and to the drive efficiency of the proposed aircraft configuration. Moreover, reference is made to the above statements relating to the first and second embodiments.

The implementation of the invention is not limited to the preferred embodiments set out above. On the contrary, a plurality of variants is conceivable which makes use of the solution claimed even for other embodiments. Explicitly, all combinations of the embodiments mentioned above with each other which are technically possible, are disclosed herewith. Thus for example the diameter of the propellers can be smaller and these propellers can then be encased. The aerofoil could for example additionally have winglets on the wing ends.

LIST OF REFERENCE SIGNS 1 aircraft
2 fuselage
3 front wing
4 rear wing
5 right propulsion unit
6 left propulsion unit
7 right propeller
8 left propeller
9 rear tail unit
10 fin
11 right propulsion unit pylon
12 left propulsion unit pylon
13 right housing
14 left housing
15 middle propulsion unit
16 middle propeller

The invention claimed is:

1. An aircraft comprising:
a tandem wing arrangement comprising a front wing and a rear wing, and at least two aero engines disposed on the upper face of the rear wing, wherein the aircraft has a single fuselage and wherein both wings are constructed as trapezoidal wings having an aspect ratio (AR) in the range of $12 \leq AR \leq 25$, in particular $16 \leq AR \leq 24$;
wherein the at least two aero engines are disposed on pylons on the upper face of the rear wing;
wherein housing tubes are provided which extend between the front wing and the rear wing; and
wherein the housing tubes are fastened to the underside of the front wing and via the pylons connected to the upper face of the rear wing.

2. The aircraft according to claim 1, wherein the two wings of the tandem wing arrangement are vertically spaced apart in the yaw axis direction.

3. The aircraft according to claim 1, wherein the front wing is fastened to the top of the fuselage, whereas the rear wing is fastened to the underside of the fuselage.

4. The aircraft according to claim 1, wherein the rear wings have a greater span than the front wing.

5. The aircraft according to claim 1, wherein the lift distribution between the lift of the front wing and the lift of the rear wing is approximately 45:55, preferably 50:50.

6. The aircraft according to claim 1, wherein a hybrid electric or purely electric aero engine is provided.

7. The aircraft according to claim 1, wherein a further aero engine is provided at the rear of the aircraft fuselage.

8. The aircraft according to claim 1, wherein a propeller engine is provided as aero engine.

9. The aircraft according to claim 1, wherein the propeller engine has thrust propellers.

10. The aircraft according to claim 1, wherein the aircraft is designed to be unstable in terms of flight mechanics.

11. The aircraft according to claim 1, wherein a flight controller is provided in order to generate artificial stability.

12. The aircraft according to claim 1, wherein the aircraft is one of a manned passenger and a cargo aircraft.

* * * * *